United States Patent [19]

Robinson et al.

[11] 3,993,851
[45] Nov. 23, 1976

[54] NOVOLAK-TYPE RESINS AND VARNISHES

[75] Inventors: Joseph Gordon Robinson, Winchcombe; Sally Ann Brain, Tewkesbury, both of England

[73] Assignee: Coal Industry (Patents) Limited, London, England

[22] Filed: Apr. 30, 1975

[21] Appl. No.: 573,116

[30] Foreign Application Priority Data
May 10, 1974 United Kingdom............... 20904/74

[52] U.S. Cl.............................. 428/531; 260/51 R; 260/57 R; 260/57 A; 260/57 C; 260/59 R
[51] Int. Cl.²........................ B32B 9/04; C08G 8/08
[58] Field of Search.............. 260/57 A, 57 R, 57 C, 260/59, 51 R

[56] References Cited
UNITED STATES PATENTS

| | | | |
|---|---|---|---|
| 2,237,634 | 4/1941 | Rosen | 260/57 A |
| 3,303,167 | 2/1967 | Kakiuchi et al. | 260/57 R |
| 3,347,952 | 10/1967 | Tanaka | 260/59 X |
| 3,370,023 | 2/1968 | Huang et al. | 260/51 X |
| 3,398,107 | 8/1968 | Rowe et al. | 260/51 X |
| 3,406,132 | 10/1968 | Winegartner | 260/57 A |
| 3,535,183 | 10/1970 | Tveten et al. | 60/57 R X |

OTHER PUBLICATIONS

Chem. Abstracts, vol. 59, 1963, 7722f, Bakelite.
Chem. Abstracts, vol. 63, 1965, 760a, Moshchinskaya et al.
Chem. Abstracts, vol. 76, 1972, 34873w, Ueno.
Chem. Abstracts, vol. 79, 1973, 147109g, Lizuka, et al.
Chem. Abstracts, vol. 80, 1974, 15674y, Lizuka, et al, Effective Date 11/72.
Chemistry of Phenolic Resins, Martin, p. 153, 1956.

Primary Examiner—Edward M. Woodberry
Attorney, Agent, or Firm—Stevens, Davis, Miller & Mosher

[57] ABSTRACT

Novolak-type resins are prepared by phenolating a toluene-formaldehyde resin of oxygen content 4 – 18% and the product is reacted with hexamine to give a higher softening point of not less than 60° C. The resins may be dissolved in a solvent to form a varnish; such varnishes can impregnate sheet material and laminates of good water resistance and electrical properties can be formed therefrom.

7 Claims, No Drawings

NOVOLAK-TYPE RESINS AND VARNISHES

The present invention concerns novolak-type resins and varnishes.

According to the present invention there is provided a method for the manufacture of a novolak-type resin of softening point not less than 60° C which method comprises reacting a toluene-formaldehyde resin having an oxygen content within the range 4 to 18% by weight with a phenol to form a novolak-type resin, and reacting the product with hexamine to raise its softening point to not less than 60° C. The toluene-formaldehyde resin preferably has an oxygen content of 8 to 12% by weight. The resin may be formed by the reaction of para-formaldehyde with toluene in the presence of sulphuric acid and the molar ratio of formaldehyde to toluene may be greater than 1. It is preferred that the molar ratio of formaldehyde to toluene is 2.5: 1 to 4:1.

The sulphuric acid may be present in concentration of 30% to 65% w/w $H_2SO_4$ and preferably in concentration of 47%–57%. Suitably the molecular weight of the toluene-formaldehyde resin is in the range 220 – 1000, preferably 250 – 500.

The proportion of phenol may be at least 0.5 parts/part weight of toluene-formaldehyde resin and is preferably 0.7 to 2.0 parts/part weight of toluene-formaldehyde resin. A catalyst, for example paratoluene sulphonic acid, may be used to initiate the reaction. Preferably the rate of heat evolution is controlled by slow, partwise addition of the toluene-formaldehyde resin to the phenol.

Preferably, phenol itself is used but mono substituted phenols such as monoalkyl phenols, e.g. methyl phenol or ethyl phenol, and monoayl phenols, e.g. monophenyl phenol, may be used.

A proportion of hexamine is added to the novolak-type resins to increase its softening point to not less than 60° C. Suitably, the novolak-type resin is reacted with about 2% by wt of hexamine at about 130° C.

The present invention includes resins when prepared by the method of the invention. The invention also includes a novolak-type varnish which comprises the novolak-type resin according to the invention, dissolved in a solvent. The solvent is preferably industrial methylated spirit or it may be a ketone, for example acetone or methyl ethyl ketone.

The varnish may contain 30 – 65% wt/wt of novolak-type resin in solvent, conveniently 50% wt/wt.

A further proportion of hexamine is preferably added to the varnish to promote curing of the novolak-type resin, after the solvent has been driven off, in the preparation of laminates. Suitably 10 to 12% by wt of hexamine is dissolved in the solvent.

The varnish in accordance with the present invention may be used in the production of laminates and the present invention, therefore, provides laminated articles, which can be formed by drawing sheets of absorbent material, such as paper or cotton, through the varnish in accordance with the invention, passing the impregnated sheets between rollers, heating the impregnated sheets to pre-cure them and thereafter several sheets are compressed into laminates by heating together at an elevated temperature and pressing to a desired form of shape.

To improve the resistance to deformation under load at elevated temperature (for example, as measured by British Standard test BS 2782 Method 102B (1970)) of the laminates, it is desirable to purify the resin by distilling off unphenolated low molecular weight products, especially ditolyl methane, conveniently by passing steam at approximately 150° C through the crude novolak-type resin held at approximately 130° C.

The invention thus also provides laminated articles comprising sheets of material impregnated with a cured novolak-type resin in accordance with the present invention.

The following is a description, by way of example only, of methods of carrying the invention into effect. In the following examples, parts and percentages are by weight unless otherwise stated.

EXAMPLE 1

23 parts of para-formaldehyde 87 were added to 17.7 parts of 65% w/w aqueous sulphuric acid. The temperature of the solution was gradually increased and at a temperature of 60° C, 20 parts of toluene were added and the mixture stirred. The temperature was then raised to 97° C and progressively increased to 103° C over a 6 hour reaction period. At the end of the resinification process, a surface active agent was added to break the emulsion and the aqueous layer settled out and was run off. The resin was then washed with water and this was followed by a wash with dilute sodium carbonate solution. The resin was then water washed until a pH of approximately 7.5 was obtained in the washed water. Residual toluene was then distilled off to obtain 26.8 parts of a mobile yellow resin. This product has an oxygen content of 11% and a molecular weight of 440.

25 parts by weight of phenol was then added to a reactor together with 0.1 parts of para-toluene sulphonic acid as catalyst. The temperature was increased to 100° C whereupon 25 parts of the toluene-formaldehyde product resin referred to above was added slowly to control the rate of heat evolution. When all of the toluene formaldehyde resin had been added, the reaction was allowed to continue for a further hour. The resulting product was then heated to 130° and superheated steam at 150° C passed through to remove unphenolated low molecular weight products. The resultant resin was then heated at 130° C with one part of hexamine to increase the softening point of the product resin to 60° C.

A phenol-toluene-formaldehyde resin of the novolak-type was obtained and was cooled to about 70° C. 50 parts by weight of industrial methylated spirit were then added which dissolved the resin within an hour to produce a varnish. A further 6 parts by weight of hexamine were added to the varnish to promote the curing characteristics of the novolak-type resin. This varnish was found to have excellent properties for the production of laminated articles. By way of example, sheets of high absorbent Kraft paper were drawn through the varnish and the impregnated sheets were passed between rollers. The impregnated paper was then pre-cured by heating at a 130° C for 2 to 5 minutes, thereby driving off the solvent to a volatile content of from 2.5 to 5% by weight.

It will be appreciated that in an industrial operation the optimum conditions in any particular case would be found by experiment in order to establish the lowest volatile content of the resin at which the resin will flow during the laminating procedure to give a laminate of 45 to 60% resin.

The pre-cured sheets were then compressed into laminates by heating at a temperature of 150° C under a pressure of 1,000 p.s.i.g. The laminates were characterized by measuring their resistance to water ingress and by their electrical properties.

EXAMPLE 2

Four laminates were produced in analogous manner to that described in Example 1 and their properties are set out below:

| Laminate | Softening point of Novolak °C | Pre-cure time (min) | Volatile matter (%) | Resin in laminate (%) | Water abs (%) | Tan δ (Power factor) | Dielectric constant |
|---|---|---|---|---|---|---|---|
| 1 | 76 | 7 | 4.3 | .60 | 2.8 | 0.079 | 4.00 |
| 2 | 82 | 7 | 5.6 | 57 | 3.2 | 0.051 | 4.45 |
| 3 | 67 | 5 | 4.8 | 50 | 9.1 | 0.031 | 4.56 |
| 4 | 67 | 5 | — | 52 | 6.9 | 0.025 | 4.32 |

EXAMPLE 3

Example 1 was repeated to prepare a varnish, except that the proportions by wt. of the reactents for the formation of the toluene-formaldehyde resin were as follows:

| | |
|---|---|
| Toluene | 100 |
| Water | 19.7 |
| Sulphuric Acid (98%) | 30.8 |
| Formalin (40% HCHO) | 66 |

We claim:

1. A laminating varnish comprising an alcohol-soluble novolak-type resin of softening point not less than about 60° C., which resin is produced by reacting toluene with formaldehyde or a formaldehyde donor, in a molar ratio of toluene: formaldehyde of 1:2.5 to 4, in the presence of 30 to 65% w/w sulphuric acid to form a toluene-formaldehyde resin having an oxygen content within the range 4 to 18% by weight, and a molecular weight of from about 250 to about 500, reacting said toluene-formaldehyde resin with phenol in an amount of 0.7 to 2.0 parts by weight per part by weight of said toluene-formaldehyde resin to obtain an alcohol-soluble novolak-type resin product and treating said product with hexamine to raise its softening temperature to not less than about 60° C., a varnish solvent and a further proportion of hexamine.

2. A varnish as claimed in claim 1, wherein the oxygen content of the toluene-formaldehyde resin is from 8 to 12% by weight.

3. A varnish as claimed in claim 1, wherein the novolak-type resin product is treated with about 2% by weight of hexamine, at a temperature of about 130° C.

4. A varnish as claimed in claim 1, wherein the novolak-type resin product is purified by distilling off unphenolated low molecular weight products, before the reaction with hexamine.

5. A varnish as claimed in claim 1, wherein the solvent is industrial methylated spirit.

6. A varnish as claimed in claim 1, wherein the solvent contains about 10 to 12% by weight of hexamine.

7. A laminated article comprising sheets of material impregnated with a hardened varnish as claimed in claim 1.

* * * * *